United States Patent [19]

Wardle et al.

[11] Patent Number: 5,054,369
[45] Date of Patent: Oct. 8, 1991

[54] MULTIPLEXED HYDRAULIC CONTROL SYSTEM WITH PLURAL SELECTOR VALVES

[75] Inventors: John W. Wardle, Roscoe; Donald E. Wernberg, Rockford, both of Ill.

[73] Assignee: Woodward Governor Company, Rockford, Ill.

[21] Appl. No.: 387,025

[22] Filed: Jul. 28, 1989

[51] Int. Cl.[5] .............................................. F15B 9/09
[52] U.S. Cl. ...................................... 91/361; 91/378; 91/521; 91/523; 91/529
[58] Field of Search ............................... 91/521-524, 91/459, 529, 361, 363 R, 378, 461; 137/883

[56] References Cited

U.S. PATENT DOCUMENTS

| | | | |
|---|---|---|---|
| 3,645,141 | 2/1972 | Moore et al. | 73/420 |
| 3,968,730 | 7/1976 | Lionet | 91/361 X |
| 4,191,215 | 3/1980 | Gonner | 137/870 |
| 4,271,867 | 6/1981 | Milberger et al. | 137/625 |
| 4,325,127 | 4/1982 | Major | 364/510 |
| 4,664,136 | 5/1987 | Everett | 137/85 |
| 4,712,173 | 12/1987 | Fujiwara et al. | 364/138 |
| 4,913,032 | 4/1990 | Wernberg | 91/361 |
| 4,986,305 | 1/1991 | Richards et al. | 137/625.15 |

FOREIGN PATENT DOCUMENTS 2174824  11/1986  United Kingdom .

OTHER PUBLICATIONS

"Imagine . . . A Self-Calibrating Pressure Transducer" advertisement for Scanivalve Corp., San Diego, Calif., 1987.
"Metering Valve W/Regulator" article, Tech Data South Bend Controls Inc. Bulletin, PV-210, SBC, 1987.
"Metering Valve" article, Tech Data South Bend Controls Inc. Bulletin, PV-211, SBC, 1987.
Article entitled "Actuator Accepts Electrical Digital Control Signals Directly—Eliminates Digital-To-Analog Converters".

Primary Examiner—Edward K. Look
Assistant Examiner—George Kapsalas
Attorney, Agent, or Firm—Leydig, Voit & Mayer

[57] ABSTRACT

A multiplexed hydraulic control system having a plurality of channels and a common source of modulated hydraulic fluid. The common source is shared among the plurality of channels by providing a plurality of selector valves, one for each channel, with electrical solenoids for the selector valves being individually controlled by a control means. In a normal operating mode, the selector valves are operated individually and the modulating means is controlled to direct fluid to the selected channel in accordance with the demands placed on movement of the actuator in that channel. In a second slewing mode, multiple selector valves are energized at the same time and the modulator is controlled to produce sufficient fluid flow to slew all of the actuators in the selected channels at a desired rate.

14 Claims, 3 Drawing Sheets

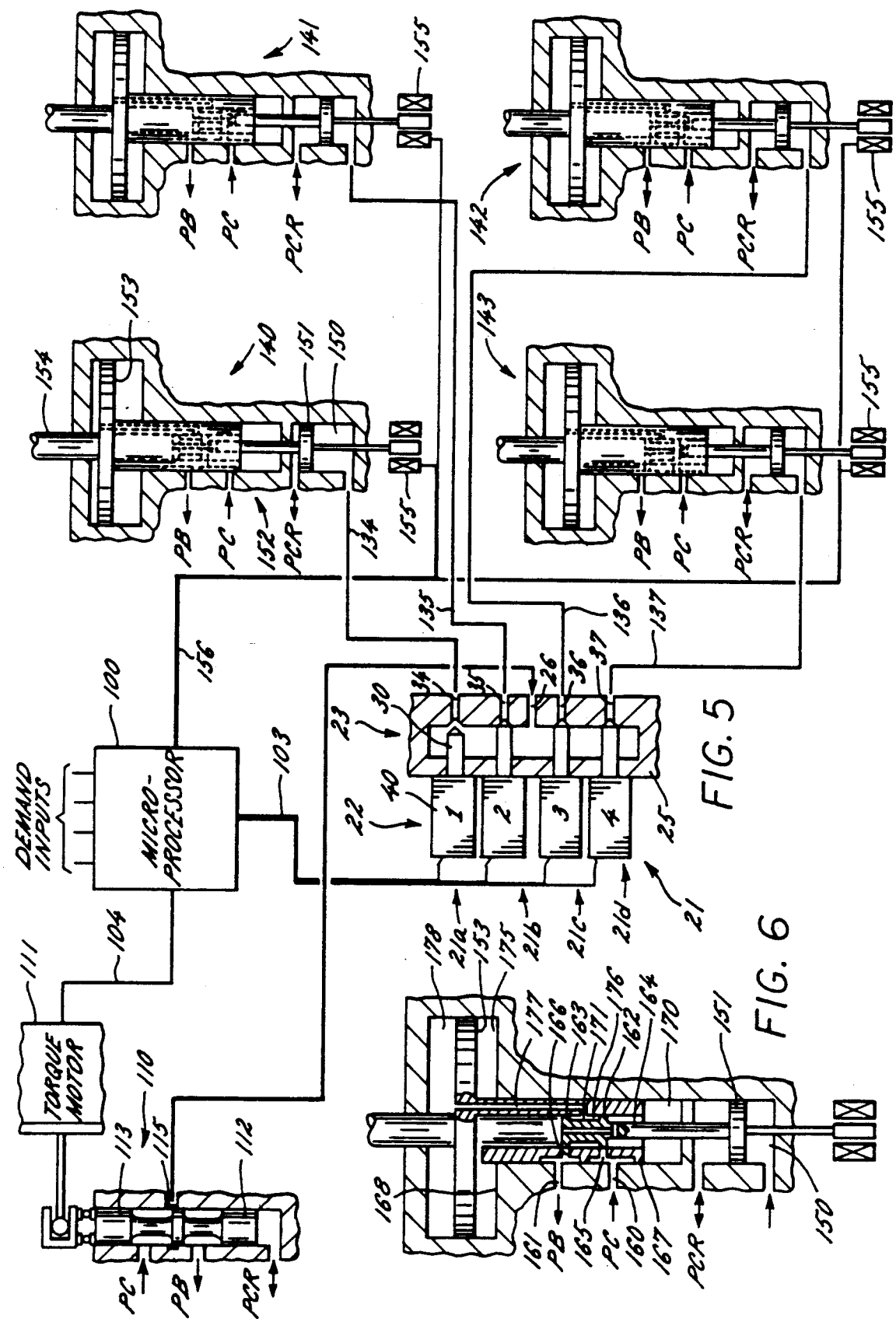

MULTIPLEXED HYDRAULIC CONTROL SYSTEM WITH PLURAL SELECTOR VALVES

BACKGROUND OF THE INVENTION

1. Field of the Invention

This invention relates to hydraulic control systems, and more particularly to such systems in which a plurality of hydraulic actuators are to be precisely positioned in dependence on the magnitude of a similar plurality of electrical control signals.

2. Description of the Prior Art

There are numerous such control systems, and this invention would represent a significant advantage in connection with many of them. One exemplary and very significant application of such controls is in aircraft systems where hydraulic controls are provided for adjusting mechanical variables in jet aircraft engines. The gas turbine engines which are used to power conventional jet aircraft have commonly used hydraulic actuators for control of air valves, fuel valves, engine variable geometry, and the like. As engine designers attempt to achieve more and more performance from the gas turbine, the number of hydraulic actuators has increased significantly, and may approach 17 in number. Even gas turbine engines used on older commercial aircraft typically have on the order of six hydraulic actuators.

Heretofore, each hydraulic actuator was provided with a device to convert an electrical input signal into a mechanical actuator position. Most typically, that had been done with a torque motor connected to and driving a hydraulic servo valve; the servo valve, in turn, controlled the supply of hydraulic fluid to the actuator. The torque motor, being dedicated to the associated actuator, could be driven for as long as additional actuator movement was desired. However, both torque motors and servo valves are fairly expensive, and both are fairly weighty components, particularly for aircraft applications where weight savings on the order of pounds can translate into substantial operating cost savings over the life of the aircraft.

Applicants are aware of a concept having been proposed to reduce weight and cost in such systems, by using a single pilot valve multiplexed among a plurality of actuators. In substance, the pilot valve has a spool which is rotated for multiplexing and which is positioned vertically by the torque motor to establish control positions. The spool and valve would be modified to provide a plurality of outlet ports at different angular positions of the spool such that the vertical control position of the valve combined with a plurality of angular multiplex positions could be used to sequentially deliver hydraulic fluid to a plurality of actuators. A position sensor on the rotary multiplexer would be used to coordinate multiplexed electrical signals for the pilot valve with the time slots of the multiplexer.

It is applicant's belief that a system of that type could not be reduced to practice for any but the most rudimentary systems because of a number of limitations, the most prominent one being the substantially reduced flow rate to any given actuator for a servo valve of any reasonable size. The flow rate reduction is a result of two factors —1) reduced flow through a pilot valve which is configured as a multiplexer, and 2) the fact of multiplexing itself which has flow going to an actuator only during its time slot. For a three channel system, the flow rate per cycle as compared to a standard non-multiplexed pilot valve would be reduced by about a factor of about 18. Thus, while in principle the system might work in applications where speed of response and fineness of control are not important criteria, in a jet engine control, for example, the concept would not appear to be workable.

Multiplexing of hydraulic circuits is not broadly new. It can be used for example in sharing a single transducer among a number of hydraulic or pneumatic channels, such as illustrated in Moore et al. U.S. Pat. No. 3,645,141. The opportunity to share a control servo valve among multiple actuators is also suggested in the literature, but on a manually controlled rather than a simultaneous multiplexed real time basis, insofar as applicant is aware. In contrast, in a true hydraulic multiplexed system, control should be maintained over all of the channels, while servicing those channels individually and separately, but with sufficient frequency to maintain the outputs as representative of the inputs in substantially real time.

With respect to the prior multiplexing concept, insofar as applicant is aware, it has relied on a rotary multiplexer for sequentially activating the ports in the system. While rotary multiplexing can, in principle, be built in a very reliable fashion, acceptance of the rotary mode of operation imposes a number of drawbacks. Most particularly is the fact that the sequence is fixed by virtue of the mechanical connection of the channels to the rotary multiplexer. Each channel must be serviced in its sequence whether or not the channel has a demand for motion of its associated actuator. Thus, in the event that one or more of the channels demands a large actuator movement whereas another channel in the system is completely quiescent, each of the channels must be serviced in their assigned sequence, one at a time, and for the duration of their assigned time slot, even if service for the former is inadequate and service for the latter is superfluous. In summary, it is not only impossible to alter the sequence of channels to be individually serviced during operation of a rotary system, but it is also not possible to alter the length of the time slot of one channel with respect to any of its neighbors. This inherent inflexibility is undesirable in certain circumstances.

One of the significant limitations of even conceptual multiplexing control systems in which the channels must be serviced in a repetitive sequence is the inability to adequately respond to control situations which demand rapid movement of plural channels. Maximum fluid flow rate may be passed to each of the channels requiring maximum movement, but that can only be done during their assigned time slot and the system typically demands a brief dwell time between time slots. As a result, the response to demands for rapid change can be expected to be sluggish as compared to non-multiplexed systems. Sequential multiplexed systems provide no convenient means for actuating more than a single channel at a given time, and thus apparently cannot provide the equivalent of non-multiplexed systems where, for example, in a "hard over" situation, all of the affected actuators can be simultaneously driven from one extreme toward the other at maximum rate by their independent torque motors. That individualized flow control per channel at a high flow rate appears to stand in contrast with conventional multiplexing thinking which would dictate individual operation of the channels if flow from the shared source to each channel were to be controlled.

SUMMARY OF THE INVENTION

In view of the foregoing, it is a general aim of the present invention to provide a practical and reliable hydraulic multiplexed control system which does not rely upon rotary commutation for multiplexing.

In that regard, it is an object of the present invention to provide a hydraulic multiplexed control system in which the control system has the capability of activating multiple channels simultaneously.

It is a further object of the present invention to provide a reliable highly accurate multiplexed hydraulic control system in which the control has the flexibility for activating the outlet channels in any desired sequence or combination.

In achieving those objects, the invention provides a multiplexed hydraulic control system in which the multiplexer comprises a plurality of selector valves, one for each channel, each selector valve having an output coupled to the associated channel, and all of the selector valves sharing a common inlet. Means are provided for coupling a source of hydraulic fluid to the common inlet. Feedback means are associated with the actuators in each channel for providing feedback signals indicative of the actuator position. Control means accomplish several functions. First of all, the control means selectively energizes one or more of the selector valves to couple the inlet to the output of any valve which is energized. At the same time, the control means modulates the hydraulic fluid flow to the output of any energized selector valve in accordance with the electrical control signal for the associated channel. The control means also responds to signals from the feedback means with the result being the positioning of the actuators in the channels in accordance with the associated plurality of electrical signals.

In one embodiment of the invention, an unmodulated hydraulic fluid flow is coupled to the common inlet of the selector valves, and the control means modulates the fluid flow by controlling the on and off times, in other words, by pulse width modulating the outputs of the energized selector valves. In another embodiment, means are provided for modulating the fluid flow rate which is coupled to the common inlet of the selector valves, and of the control means produces control signals and couples such control signals to the modulating means for adjusting the flow rate to the common input of the multiplexer. In either event, one or more of the selector valves can be energized by the control means while the control means also acts to control flow rate to the selected channels (either by modulating the rate or modulating the on and off times) to control the positions of the actuators in the channels in accordance with the associated plurality of electrical control signals.

It is a feature of the present invention that a multiplexed hydraulic control system is provided which has two modes of operation. A first mode switches a single input to individual outputs in sequence, and can activate the outputs either in a repetitive sequence or a variable sequence and can assign either constant or variable dwell times. Importantly, a second mode is also provided which can be activated by the control system on demand, and in which the single hydraulic inlet is coupled simultaneously to a plurality of outputs so that adjustment is made in a plurality of channels at the same time. This latter feature is significant in situations where rapid movement of the actuators in a number of channels is required; the system can be activated in this second mode to rapidly advance all of the selected actuators toward their newly demanded positions in the most efficient way possible.

It is a further advantage of the invention that the multiplexer components which actually switch the hydraulic signals from multiplexer input to multiplexer output can be simple devices which are easy to construct with the necessary reliability. In the simplest embodiment, simple two-position solenoid operated selector valves can be utilized. The multiplexing logic is performed in the electrical control system itself, and electrical output signals are used to energize the solenoids of the solenoid operated valves in the multiplexer in any desired sequence or combination to achieve either of the two modes described above.

It is an advantage of such a system that the computerized control which is charged with maintaining the position of the actuators in the channels of the hydraulic control system has the opportunity to activate the channels in any desired sequence or combination, for any desired length of time.

With the random access capability thus provided by a multiplexer in accordance with the present invention, the computerized control which is typically associated with such devices has exceptional flexibility in controlling its channels. The control can be configured, for example, to access particular channels only when those channels demand service, to prioritize certain channels related to equipment whose movement is more critical than that of others, to alter a normal pattern of port access in abnormal situations, or to select multiple ports for simultaneous movement.

Among the advantages achieved by the invention is the simplification in both the multiplexer driver and the multiplexer itself. The multiplexer driver need require no complex drive circuitry; it is necessary to simply produce individual drive signals for the channels of the multiplexer in any desired order or combination. The multiplexer itself is also simplified, using simple and inexpensive elements, such as ordinary solenoid operated selector valves, which can be produced to operate with the high reliability demanded of jet aircraft controls.

Other objects and advantages will become apparent from the following detailed description when taken in conjunction with the drawings, in which:

BRIEF DESCRIPTION OF THE DRAWINGS

FIG. 5 is a diagrammatic illustration of a multiplexed hydraulic control system illustrating a further embodiment of the present invention;

FIG. 6 is a diagram illustrating one of the dog valve actuators of the system of FIG. 5.

While the invention will be described in connection with certain preferred embodiments, there is no intent to limit it to those embodiments. On the contrary, the intent is to cover all alternatives, modifications and equivalents included within the spirit and scope of the invention as defined by the appended claims.

DETAILED DESCRIPTION OF THE PREFERRED EMBODIMENTS

Figure 1:
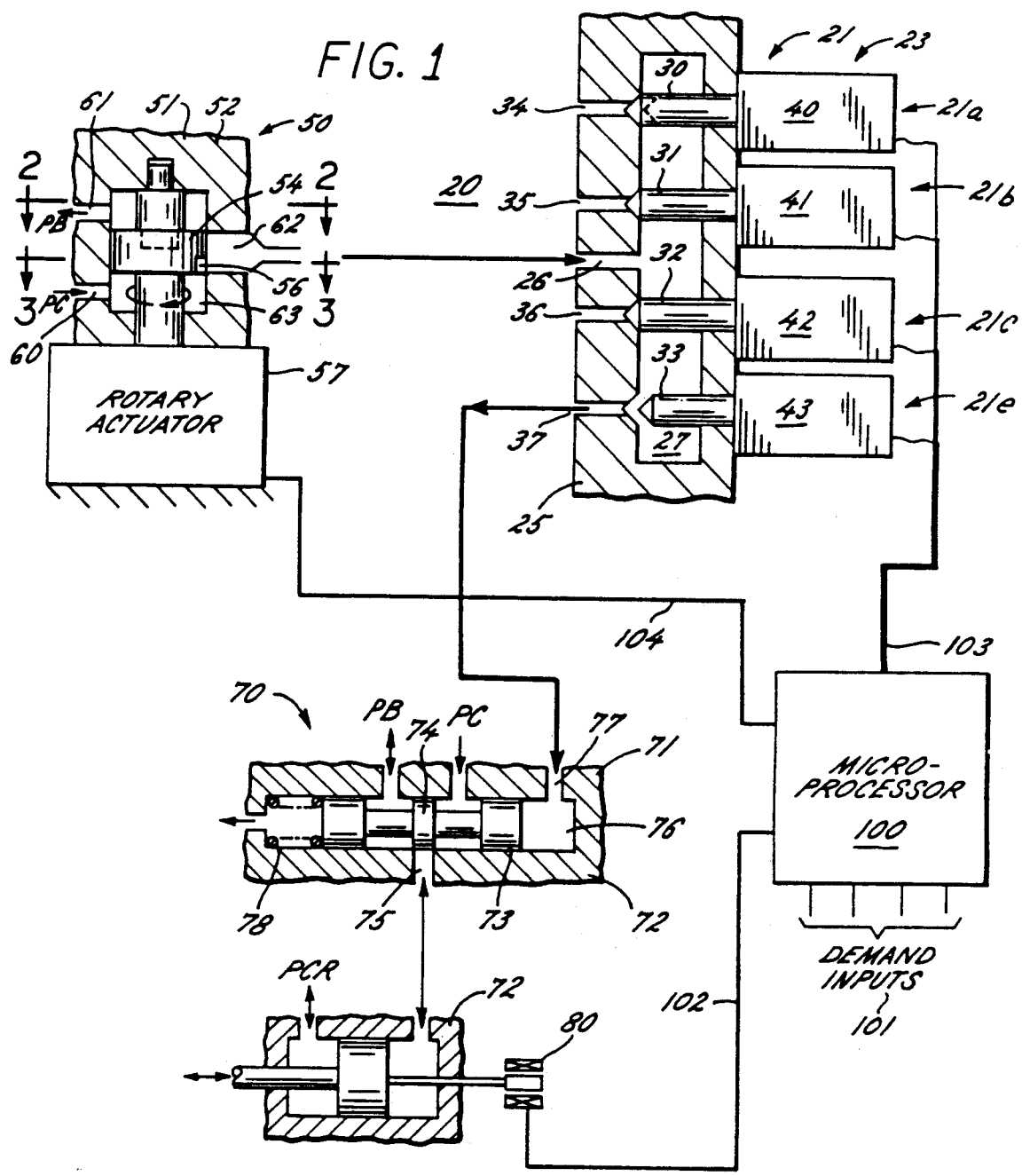
FIG. 1 is a diagram schematically illustrating a multiplexed hydraulic control system constructed in accordance with the present invention.

Turning now to the drawings, FIG. 1 shows a multiplexed hydraulic control system 20 constructed in accordance with the principles of the present invention. The system includes a multiplexer generally indicated at 21 made up of a plurality of selector valves 21a–21d, the selector valves each having a sole valve member 30–33. The valve members 30–33 are shown as housed in a unitary manifold assembly 25 having a single inlet 26 coupled to an internal chamber 27 which feeds all of the valves 21. The plurality of valve members 30—33 control respective output ports 34–37 for coupling fluid which flows through the single inlet 26 to the respective outlets 34–37.

In the illustrated embodiment, the valves are solenoid operated, being operated by a bank of solenoids 23 comprising individual solenoids 40–43 connected to the respective valve members 30–33. In the de-energized condition, the output port of the associated valve remains closed, such as is illustrated by the centermost valves 31, 32. However, when the solenoid is energized the valve is actuated to couple the inlet 26 to the output port, such as is illustrated by the solenoid combination 33, 43 in which the solenoid 43 is energized to withdraw the valve member 33 from its seat, allowing fluid to flow through the inlet 26 by way of the common chamber 27 to the output port 37 and the associated channel.

It is noted that the term "selector valve" is used herein to refer to a control device employed on a one-per-channel basis which can directly and independently provide an "on" or "off" function for fluid flow to the channel in which it is connected. The selector valves are associated with their respective channels and are controlled such that they are independently operated. In being so disposed, the selector valves assure that the on or off condition of a particular channel need not (insofar as the selector valve is concerned) be affected by the on or off condition of any other channel.

In practicing the invention, the single inlet 26 of the selector valve bank is coupled to a source of hydraulic fluid illustrated generally at 50. In the illustrated embodiment, the source 50 is modulated and includes a rotary valve 51 having a valve body 52 in which a valve member 53 is mounted for rotation. The valve member 53 has a single land 54 on which is formed a pair of flats 55, 56, one on the bottom and one on the top (see FIGS. 2 and 3). A rotary actuator 57 controls the angular position of the rotary valve member 53 to control the open or closed nature of the valve 51. It is seen that a pair of inlet ports 60, 61 are provided, the port 60 being connected to the high pressure hydraulic source PC, and the inlet port 61 to the hydraulic sump PB.

Figure 2:
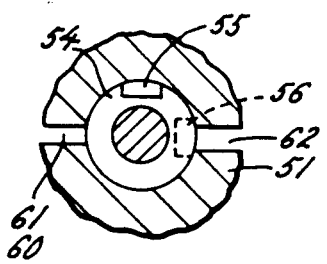
FIGS. 2 and 3 are sectional views taken along the lines 2—2 and 3—3, respectively, of FIG. 1 illustrating the details of the modulating valve particularly adapted for proportional control.
Figure 3:
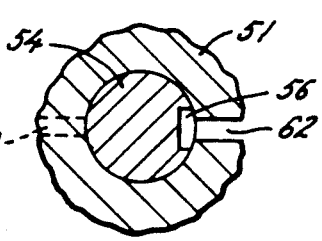

When the valve is in the condition illustrated in FIGS. 1-3, the lower slot 56 is facing an output port 62 such that the high pressure source PC is coupled through an internal cavity 63 by way of the slot 56 to the output port 62 such that the flow from the high pressure source PC is coupled by way of the multiplexer input 26 to the internal chamber 27 and thence to any channel whose solenoid is energized.

If the valve member 53 is rotated 90° clockwise (as illustrated in FIG. 2), the port 56 will be closed and the port 55 will open connecting the sump inlet port 61 through an internal cavity 65 and by way of the slot 55 to the output port 62 and thence by way of the inlet 26 of the multiplexer and the internal chamber 27 to the output ports of any of the channels which are activated. As a result, any of the activated channels will have a hydraulic flow from the channel through the seat of the energized valve and the internal chamber 27 through the modulating means 50 and back to sump PB.

The rotary actuator 57 controls the degree of opening and closing of the ports 55, 56 to modulate the flow to the inlet port 26 and thence to the internal chamber 27 thereby to modulate flow to the selected or activated channels. In the case where proportional modulation is desired, the rotary actuator 57 can be in the form of a rotary voice coil or stepping motor to precisely control the angular position of the control land 54 and thereby proportionately modulate the flow rate through the output port 62. It will be appreciated from FIGS. 2 and 3 that there is adequate separation between the PC and PB passages 56, 55 to provide an "off" position between PC and PB to allow complete modulation of flow rate.

In an alternative embodiment, it is entirely possible to simply couple PC or PB to the common inlet without proportional modulation, and accomplish modulation by utilizing pulse width modulation techniques on the selector valves 21. More particularly, in that embodiment, the rotary actuator 57 need be only a three position actuator, with the three positions being (1) PC full on, (2) both PC and PB off, and (3) PB full on. As will be described in connection with the control system, when utilizing such a system the control means causes the rotary actuator to select the appropriate one of three conditions, and the control means controls the on time of the associated selector valve to achieve the desired flow rate to the channel in question.

Figure 4:
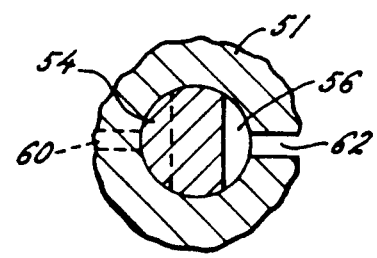
FIG. 4 is a sectional view similar to FIG. 2 illustrating an alternative configuration of the modulating valve particularly adapted for on/off rather than proportional control.

FIG. 4 illustrates a further alternative for the modulating valve 50 which achieves the three conditions described immediately above but in a repeating free-running sequence. It is seen that in FIG. 4 that a modified valve land 54a is provided having an enlarged pair of flats 55a, 56a. Utilizing the valving arrangement of FIG. 4, the rotary actuator 57 continuously rotates the land 54a to continuously sequence between the PC on, all off, PB on conditions, and the selector valves are controlled in conjunction with that sequence to provide controlled fluid flow to the associated channels. In any of the cases, however, the microprocessor not only controls the selector valves, but also controls the modulated flow through the selector valves to position the actuators in the channels in accordance with the plurality of electrical control signals associated with those channels.

Referring again to FIG. 1, it will be appreciated that each of the outlet ports 34–37 is coupled to an associated outlet channel. However, for the sake of avoiding complication of the drawings, only a single channel 70 is illustrated, i.e., the channel coupled to the output port 37. It is seen that each of the output ports 34–36 will be connected to a similar channel for control thereof. It will also be appreciated from the broken lines which terminate the valve body 25 at its top and bottom, that the system contemplates many more channels, only four channels being illustrated for the purpose of illustrating the invention without overcomplicating the description.

In a presently preferred manner for configuring the channels 70, each channel will include a second stage valve 71 connected to receive flow from the associated output port, and to integrate that flow for controlling a second flow rate from source PC or sump PB to a hydraulic actuator 72 which is the control element of the channel. The hydraulic actuator 72 will control the mechanical elements, such as fuel flow rate devices, engine variable geometry, and the like, which represent the controlled output of the system.

For a more complete description of the second stage valve 71, reference is made to U.S. Pat. No. 4,984,505. To the extent necessary, the disclosure of this patent is incorporated herein by reference. However, briefly, it will be noted that the second stage valve 71 includes a valve body 72 having a spool 73 mounted for reciprocation therein, the spool having a land 74 controlling an output port 75. High pressure source PC and sump PB are connected to a pair of input ports and are controllably connected to the output port 75 by positioning the spool 73 within the valve body 72. Such positioning is accomplished by flow received from the multiplexer 21 into a control chamber 76 by way of control input 77 in the second stage valve. Thus, when high pressure flow from source PC is passed through the multiplexer to the second stage valve, the spool 73 is moved to the left as shown in FIG. 1, further opening the output port 75 to the hydraulic source PC. When the control input 77 is connected by way of the multiplexer to hydraulic sump, a spring 78 forces the spool 73 to the left, causing the land 74 to ultimately open the output port 75 to hydraulic sump PB, thereby allowing the piston in the actuator 72 to move to the right as illustrated in the drawing. Feedback means 80 are associated with the actuator for providing a feedback signal indicating the actual position of the actuator.

In accordance with an important aspect of the invention, control means are provided for accomplishing several interrelated functions. In the illustrated embodiment, the control means are illustrated as a microprocessor 100. It will be appreciated by those skilled in the art that the microprocessor 100 can be programmed to accomplish the functions to be described in detail hereinafter. Alternatively, discrete digital circuitry can be used, as well as analog implementations or combinations of those implementations dictated by the nature of the control and feedback elements.

The microprocessor 100 has a series 101 of demand inputs on which receive electrical control signals which correspond to demanded position of the actuators in the respective channels. The microprocessor 100, as will be described in more detail in connection with the control block diagram, responds to the input demand signals 101 as well as feedback signals such as that produced by feedback means 80 on the line 102 to select a particular channel for actuation, and to control modulated flow to that channel to cause the actual position of the actuator to match the demanded position input on demand input line 101.

To that end, the microprocessor has a selector bus 103 which provides electrical connections to the solenoids 40-43 which are associated with the respective channels. The microprocessor 100 couples selector signals onto the bus 103 for individually or collectively energizing the solenoids 40-43 to open the valves 30-33 controlled by those solenoids. At the same time, in one embodiment, the microprocessor has a modulating bus 104 connected to the rotary actuator 57 of the modulating means 50 to match the fluid flow to the multiplexer inlet 26 to that demanded by the channel or channels which have been selected.

In practicing the invention, the control means 100 operates the system in at least two modes. In a first normal control mode, the microprocessor 100 activates the solenoids 40-43 individually, either in a repeating sequence or a variable sequence, but in any event, only one solenoid at a time. As a result, modulated flow produced by the modulating means 50 need represent only the modulated flow required by that channel to adjust its second stage valve 70 to produce the desired actuator travel and rate of travel in the channel. As the actuator actual position approaches the demanded position, the microprocessor 100 selects the solenoid of the channel in question to begin closing the second stage valve, thereby to slow the flow from PC or PB to the actuator 72, until the actuator reaches the desired position at which point the solenoid 43 would be energized in conjunction with modulated flow from the modulating means 50 to close the second stage valve. At that point, the second stage valve is closed as is valve 70 in FIG. 1, and the actuator 72 is locked in the last-adjusted position.

In carrying out the invention, the control means 100 has a second mode, sometimes termed herein the slewing mode, which is actuated in a number of situations as when a number of channels require rapid actuator movement for a substantial distance. For example, all of the controls may be hard right when the aircraft is put into a maneuver which demands slewing a majority of those controls toward the hard left position. In those circumstances, the control means 100 activates its slewing mode in which a plurality of channels are driven simultaneously. For example, consider the dot-dash illustration of valve 30, where it, along with valve 33, is open, thus simultaneously activating two channels. In most circumstances, it will be desirable to substantially increase the flow rate when multiple channels are energized, and thus the control means 100 will operate on its modulating bus 104 to control the modulated source 50 to provide increased, preferably maximum flow, to the inlet port 26 for passage to the multiple open ports 34, 37. In many circumstances, it will be desirable to open all of the ports 30-37, emphasizing the fact that the modulating means 50 will be controlled by the control means 100 to maximize flow from either the source PC or the sump PB to the inlet 26 of the multiplexer.

As a result of this action, all of the channels will provide flow to the associated second stage valves, slewing all of the actuators 72 in the channels and moving all of the controlled devices, for example, from hard right toward hard left.

It is important to note that each of the actuators includes its own feedback means 80, and the microprocessor 100 is continuously sensitive to the signals produced by those feedback means on the feedback lines 102. Thus, although the microprocessor cannot control or sense the split of flow between the output ports 34-37, it can sense the actual position of the actuator and will deactivate individual solenoids 40-43 as the feedback means 80 from the associated channel indicates that the driven actuator has reached its demanded position.

Turning now to FIG. 5, there is shown a further embodiment of the present invention which is similar to the first in that it includes a multiplexer 21 including a plurality of solenoid operated selector valves sharing a common inlet 26 by way of a manifold 25 as in the first embodiment. Also as in the first embodiment, a plurality of solenoids 22 operate the plurality of valve members 23 to connect the inlet 26 to the outputs 34-37, individually in one mode, or in combination in a second mode. Control means in the form of a microprocessor 100 drives a selector bus 103 for individually controlling the solenoids 22 of the multiplexer 21. The microprocessor also has a modulating bus 104 which controls modulating means 110 shown in the FIG. 4 embodiment as a torque motor 111 driving a spool valve 112. As is well known, the torque motor 111 adjusts the vertical position of a spool 113 within the spool valve 112 to control the opening of an output port 115 to hydraulic source PC or sump PB. As shown in the drawing, the torque motor 111 has the spool lowered from its quiescent condition to controllably couple the source PC through the output port 115 to the common inlet 26 of the multiplexer 21. In turn, the microprocessor 100 has the solenoid 40 associated with the solenoid valve 21a energized to open the output port 30 thereby to couple fluid from the source through the modulating means 110, through the multiplexer 21a to the associated channel.

In contrast to using second stage valves as described in connection with the first embodiment, the embodiment of FIG. 5 uses actuators having built-in dog valve amplifiers in each of the actuators. It is seen that the ports 34-37 are coupled to associated channels 134-137, each of the channels having an actuator 140-143 connected therein. Taking the actuator 140 as exemplary, it is seen that it has a control chamber 150 for receiving fluid flow from the multiplexer 121, the control chamber acting on a comparatively small area pilot piston 151. The pilot piston 151 in turn controls a dog valve assembly generally indicated at 152 which in turn controls the position of a working piston 153. The working piston 153 has a piston rod 154 which controls the actuated element in the aircraft or other device. Feedback means schematically illustrated at 155 provides a feedback signal on a line 156 to the microprocessor for providing a feedback signal to the microprocessor indicating the actual position of the actuator.

In summary, it is seen that the FIG. 5 embodiment provides the same modes of operation as that illustrated in connection with FIG. 1, including a first normal mode in which the channels 134-137 are actuated individually while the microprocessor operates on the modulating bus 104 to control flow to that demanded by the individual channel. The control system also has a second mode, such as a slewing mode, in which multiple valves 23 in the multiplexer 21 are actuated to provide flow to plural channels at the same time, and preferably the modulating means 110 is adjusted to increase flow rate to the multiplexer input 26 to slew all of the valves at the maximum desired rate.

Turning to FIG. 6, there is shown a more detailed drawing of one of the amplifying actuators 140 for illustrating the manner in which a relatively small fluid flow into actuating chamber 150 acting upon pilot piston 151 will control the movement of the working piston 153 of the actuator. It is seen that the dog valve actuator has a pair of inputs 160, 161 connected to the hydraulic source PC and hydraulic sump PB, respectively. A pair of control pistons 162, 163 connected by a rod 164 to the pilot piston 151 to control the open or closed nature of ports 165, 166 associated with the source PC and sump PB. A reciprocatable sleeve 167 rides within a bore in the body of the dog valve actuator and is rigidly attached to the working piston 153 at 168. A chamber 170 formed below the reciprocatable sleeve 167 communicates through an internal passage 171 in the rod 164 to a working chamber 175 below the piston 153. Similarly, an internal chamber 176 communicates through a passage 177 to an upper chamber 178 above the working piston 153. Thus, control of fluid to the chambers 175, 178 above and below the piston will cause that piston to be raised or lowered based on flow from the source PC or sump PB. Furthermore, it is seen that the control fluid in the chamber 150 acting upon the pilot piston 151 controls that flow from source or sump.

More particularly, it is seen that if fluid flows into the chamber 150, the piston 151 moves upwardly, connecting the source PC to the chamber 170 and thence through passage 176 to lower chamber 173, and also connects the sump PB by means of passage 177 to the upper chamber 178. Thus, the piston 153 with attached sleeve 167 will be forced upwardly until the lands 162, 163 on the control pistons close the ports 165, 166. Similarly, if fluid is removed by connecting the chamber 150 to sump, the pilot piston 151 will move downwardly, opening the upper chamber 178 to the source PC and the lower chamber 173 to the sump PB, causing the working piston 153 with attached sleeve 167 to follow the pilot piston downwardly until the ports 165, 166 are closed. Thus, it will be seen that the relatively small fluid flow into or out of control chamber 150 will achieve amplification in the dog valve for similar movement of the much larger working piston 153.

Figure 7:
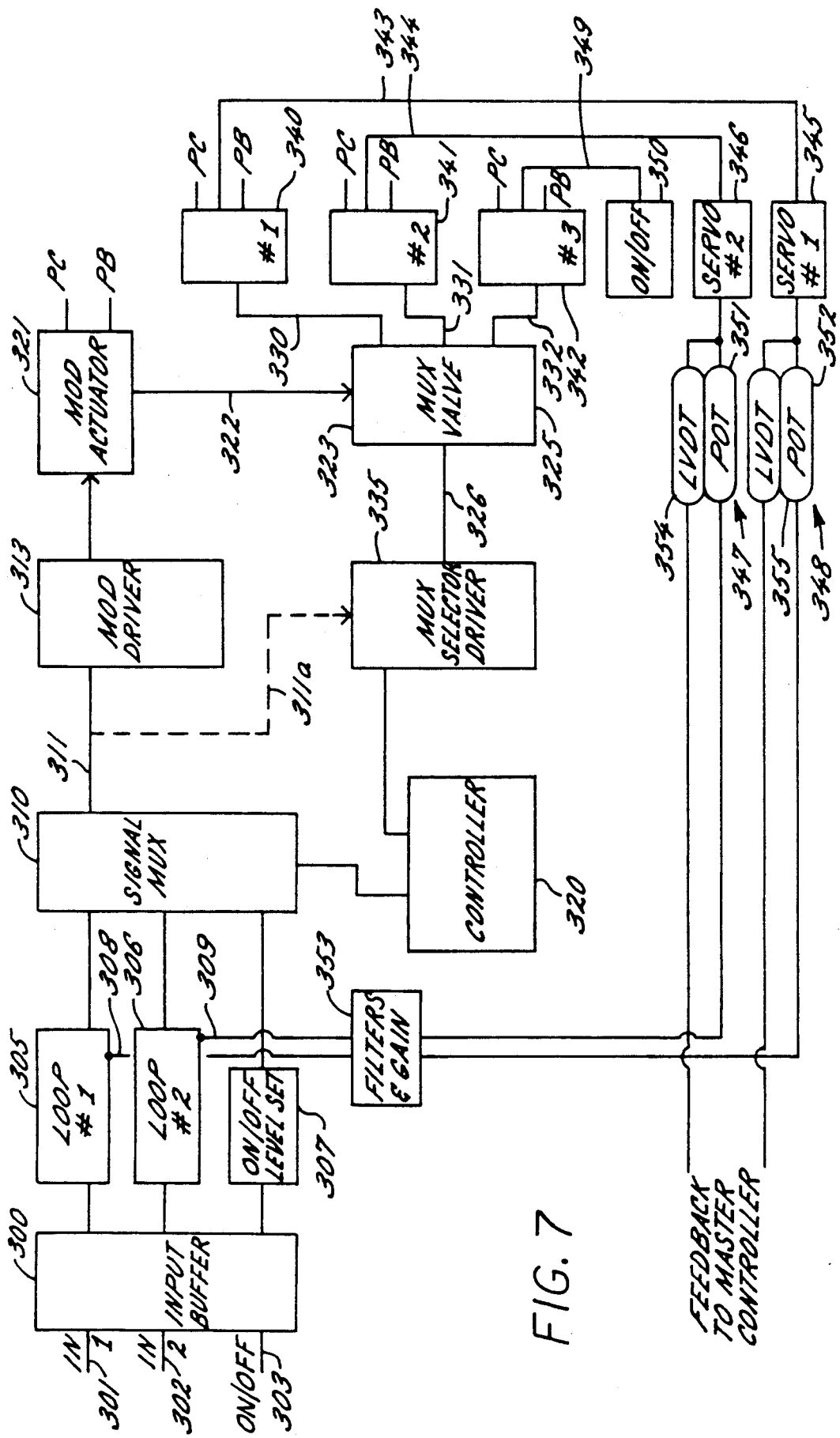
FIG. 7 is a block diagram illustrating a control system operable with the multiplexed hydraulic control systems of FIGS. 1 and 5.

Directing attention now to FIG. 7, there is shown a control loop for a multiple channel multiplexed system, in the illustrated embodiment comprising three channels. The FIG. 7 embodiment also illustrates a further modification in that two of the channels include conventional servo actuators with position and rate feedback means, while the third channel includes an on/off actuator which requires no feedback means. It is noted that only two controllable channels are illustrated in the FIG. 7 embodiment for the purposes of simplicity. In practicing the present invention, however, it will now be appreciated that many more channels can be controlled since the ability to randomly select the channels which need attention in combination with the ability to slew multiple channels simultaneously provides the opportunity to share a single modulated source among a fairly large number of channels. However, a system such as that illustrated in FIG. 7 demonstrates that one or several on/off devices can be intermixed with the controlled position actuators in the multiplexed control, and that is particularly suitable in a random access system where the control can ignore the on/off channels except on the comparatively rare occasion when it is desired to switch from one state to the other.

Referring in greater detail to FIG. 7, there is shown an input buffer circuit 300 having three input signals coupled thereto on lines 301-303. Two of the input signals are like those described in connection with FIG. 1, i.e., have levels (typically current levels) or binary digital valves which relate to a demanded position for the associated actuator. A third signal on line 303 is simply an on/off signal which demands that the actuator in the associated channel be switched either on or off. The signals, having passed through the buffer 300, are coupled to associated control loops 305, 306, 307. The loops 305 and 306 are similar to each other in that they compare the associated input signal from the buffer with a feedback signal on lines 308, 309, respectively for establishing an output signal which is proportional to the flow intended to be sent to the associated second stage valve in the next cycle. In addition, the feedback signals are particularly important when multiple channels are being operated simultaneously since the controller does not directly meter flow to each channel, but instead must monitor the response of each channel to the total flow which it is providing, as a means of assuring that the actuator in each channel is appropriately positioned. The feedback signal is preferably both a position signal and a rate signal which, when combined with the input demand signal as will be described below, produces an output signal for controlling fluid flow to the associated actuator.

The on/off signal from the third channel is coupled to on/off level set controller 307, and in this case needs no feedback from the associated actuator. The three signals on the three controllers are coupled as inputs to a signal multiplexer 310 which has a single output bus 311, operated under the control of a master controller 320 to individually introduce signals onto the output bus 311 representative of the multiplexer input signals. As noted above, the signals can be in a sequential order, but the master controller 320 also has the ability, particularly operating in conjunction with a master computer for the aircraft, to vary not only the sequence of the signals output on the bus 311, but also their dwell time. Furthermore, the controller 320 also has the ability to increase the magnitude of the modulating signal coupled to the modulating driver 313 when plural channels are selected so as to satisfy the demands of those plural channels, or so as to slew the actuators in the plural channels toward a new position at a desired relatively high rate.

In one embodiment of the invention, the sequence of control signals on bus 311 whose values are to determine the flow rate to selected channels are passed through a conventional driver circuit 313 which produces modulated output signals which are used to control a modulating actuator 321. It is recalled from the above-described embodiments that the modulating actuator which is responsive to an electrical signal to produce a corresponding hydraulic signal was illustrated as a torque motor or other electrically responsive actuator coupled to and driving a modulating valve. As shown in FIG. 7, the modulating actuator has the hydraulic source PC and sump PB connected thereto, and serves to modulate between those levels in dependence on the electrical signal provided by the driver 313. The single hydraulic input produced by the modulating actuator 321 is coupled via a hydraulic line 322 to the common input 323 of a multiplexing valve 325, configured as a bank of selector valves as illustrated in FIG. 1. The multiplexing valve has selector inputs applied on bus 326, in the form of individual electrical signals which control the coupling of the single input 322 to individual ones of a plurality of outputs 330, 331, 332 in a normal operating mode. In an alternate mode, such as for slewing, a plurality of the outputs 330, 331, 332 are connected to the single input 322 at the same time. The selector signals are amplified by a multiplex selector driver 335 to drive the electrical solenoids associated with the respective selector valve. The master controller 320 thus has complete control over both the signal multiplexer 310 and the multiplex selector driver 335 such that by producing appropriate signals on its outputs it can cause the signal multiplexer 310 to produce a modulator control signal for a channel to be altered, while at the same time imposing signals on the multiplex selector driver 335 to cause the multiplexer valve to select that channel. Thus, in a first mode, the modulator 321 produces a hydraulic flow on input line 322 which it is desired to pass to the channel in question, and the multiplexer valve selects that channel for appropriately passing the signal to the selected channel. Alternatively, in a second slewing mode, multiple channels are selected and the modulator 321 produces a higher hydraulic flow capable of sustaining the desired motion in all of those channels or from slewing the channels from a first toward a second position at a desired rate.

In an alternate embodiment of the invention, the electrical control signals on the bus 311, rather than directly controlling a proportional modulator 321, are routed as illustrated by dashed bus 311a in FIG. 7 to the multiplex selector driver for functioning as described in connection with the alternate configurations of FIG. 1. More particularly, in the alternate embodiment, the hydraulic source to the multiplexer valve in conduit 322 is non-modulated, and the electrical control signals are routed to the multiplexer selector driver 335 for direct control of the on time of the individual selector valves. Thus, the control signals are coupled with the normal on/off signals for the individual selector valves to pulse width modulate the output valves and by means of the relative on and off times of the selector valves to produce a modulated flow at the output of the selector valves even though the input hydraulic flow is unmodulated. In both cases, however, FIG. 7 illustrates that the controller 320 controls both the selection of the valves for the channels to be actuated and the modulated flow at the outputs of those valves to produce actuator positions in the respective channels which are functions of the demanded positions which are input to the control system.

In either embodiment, hydraulic outputs from the multiplexer valve 323 produced on lines 330, 331, 332 are coupled to the respective channels, and serve as inputs to second stage valves 340, 341, 342 (or to dog valve pilot stages as illustrated in FIGS. 5 and 6). As was described in connection with, for example, FIG. 1, the hydraulic signal received from the multiplexer causes translation of an internal spool in the second stage valve which causes flow to the valve output port from either the high pressure source PC or to the low pressure sump PB. It is seen that output lines from the second stage valve are coupled via lines 343, 344 to appropriate servo actuators 345, 346, respectively. The servo actuators in turn are positioned in dependence upon the flow rate through the second stage valve which itself is a function of the flow rate received from the modulating actuator 321 by way of the multiplex valve 323.

As noted above, the servo valves include feedback means 347, 348 preferably for providing both position and rate of movement indication to the processor. The second stage valve 342 has its output coupled on a hydraulic line 349 to an on/off controller 350 and thereby toggles the controller 350 to the on or off condition, depending on the signal from its associated second stage valve.

As shown in FIG. 7, each of the feedback means may comprise a pair of feedback sensors. The first can include potentiometers 351, 352 which have signals passed through filter and gain circuitry 353 to provide the respective feedback signals 308, 309 which are passed to the controllers 305, 306. As noted above, such signals can provide both position information for use by the controller in driving the actuator to the demanded position established on lines 301, 302, and also rate information used by the controller 320 to stabilize the loop. In addition to the feedback potentiometers 351, 352, additional feedback sensors can include LVDT sensors 354, 355 having lines coupled as feedback to the master controller, such as the master controller for the aircraft. The master controller may sense the position of the servos through the feedback means and adjust the demand signals on lines 301, 302 to achieve actuator positions which might be computed by a master onboard computer. The function of the feedback sensors in the multiple channel slewing mode will also again be noted, allowing the computer to maintain individual control over the channels while simply controlling total flow rate to the channels, but not having direct control over how the flow to the channels is split.

It will be apparent to those skilled in this art that the electrical control elements illustrated in the overall FIG. 7 system will typically be configured as a suitably programmed microprocessor, such as microprocessor 100 described in connection with FIGS. 1–6. In that implementation, it will be apparent that either the system will provide digital signals as inputs on lines 301, 302 or, if analog signals are utilized, an analog-to-digital converter will be associated with the input buffer 300 to digitize those signals. Similarly, digital feedback signals will be produced by the feedback sensors 351, 352 or, in the alternative, if analog sensors are utilized, a suitable analog-to-digital converter will be associated with filter and gain circuitry 353 to produce digital signals for the remaining processing. Finally, a digital-to-analog converter will be associated with the output of modulation driver 313 for those embodiments which utilize a torque motor or other actuator in its analog mode. As a further alternative, a hybrid combination of digital and analog circuitry may be utilized in which the primary signal processing, such as in the master controller 320 multiplexers and the like, is accomplished in digital fashion whereas the control loop elements 305, 306 are individual analog circuits dedicated to the respective channels. In any event, those skilled in the art will now appreciate, based on this disclosure, the manner of configuring a control loop using numerous conventional techniques in the practice of the disclosed and claimed invention.

It will now be apparent that what has been provided is an improved hydraulic multiplexed control system in which the controller has extreme flexibility of establishing the order in which the channels are to be serviced the dwell time for servicing of each channel, and the number of channels to be serviced at any given time. Even though in normal operation it may prove desirable for the controller to service the ports in sequence, in emergency or abnormal conditions the controller, when properly programmed, has the flexibility to give most attention to the channels which are most critical, a feature noticeably absent in the use of rotary multiplexers. Those channels can be selected and slewed simultaneously when necessary, achieving a degree of control unavailable using rotary multiplexers. Furthermore, the multiplexer itself, as well as the multiplexer drive circuitry, can be greatly simplified by utilizing direct drive of the selector valves, and simple on/off selector valves.

What is claimed is:

1. A multiplexed hydraulic control system having a plurality of channels for individually controlling the positions of a plurality of actuators in the respective channels in accordance with the magnitude of a corresponding plurality of electrical control signals, the control system comprising the combination of:

a multiplexer comprising a plurality of selector valves, one for each channel, each selector valve having an output coupled to the associated channel, all of the selector valves sharing a common inlet;

means for coupling a source of hydraulic fluid to the common inlet of the selector valves;

feedback means associated with the actuator in each channel for providing a feedback signal having a magnitude indicative of actuator position; and control means for (a) selectively energizing one or more of the selector valves to couple the inlet to the output of any selector valve which is energized, (b) individually responding to the respective electrical control signals to module the hydraulic fluid flow from the output of any selector valve which is energized in accordance with the electrical control signal for the associated channel, and (c) responding to the feedback means to position the actuators in the channels in accordance with the associated plurality of electrical control signals.

2. The multiplexed hydraulic control system of claim 1 in which the control means includes means associated with function (b) for pulse width modulating the output of the energized selector valve.

3. The multiplexed hydraulic control system of claim 2 in which of the control means includes means associated with function (b) for controlling the "on" time of the energized selector valve.

4. The multiplexed hydraulic control system of claim 1 in which:

the means for coupling includes modulating means responsive to a control signal for producing a modulated hydraulic flow, the modulated hydraulic flow being coupled to the common inlet of the selector valves; and the control means further includes means associated with function (b) means for producing control signals and coupling said control signals to the modulating means for adjusting the flow rate of the common inlet needed to service the channel or channels associated with the energized selector valves.

5. The multiplexed hydraulic control system of claim 4 in which the control means further includes associated with function (b) means for increasing the flow rate produced by the modulating means in the condition when more than one selector valve is energized by the control means.

6. The multiplexed hydraulic control system of claim 4 in which the control means includes slew control means for slewing a plurality of actuators from a given position in the same direction, said slew control means including means for maximizing the flow through the modulating means, and means associated with function (a) in the control means for energizing the selector valves of all the channels to be slewed.

7. The multiplexed hydraulic control system of claim 6 in which the control means further includes means associated with function (c) for responding to the feedback means to de-energize the selector valves of individual channels when the actuator in the associated channel approaches the position demanded by the associated electrical control signal.

8. A multiplexed hydraulic control system having a plurality of channels for individually controlling the positions of a plurality of actuators in the respective channels in accordance with a corresponding plurality of electrical control signals, the control system comprising the combination of:
- a multiplexer comprising a plurality of selector valves, one for each channel, each selector valve having an output coupled to the associated channel, all of the selector valves sharing a common inlet;
- modulating means responsive to a control signal for producing a modulated hydraulic flow, the modulated hydraulic flow being coupled to the common inlet of the selector valves;
- control means having two modes including a normal operating mode and a slewing mode, the control means having selector output means for energizing the selector valves and modulating output means for controlling the modulating means, in said first mode said control means (a) controlling the selector output means to operate said multiplexer means to individually energize said selector valves for dwell times determined by said control means, and (b) controlling the modulating output means to modulate flow in accordance with the electrical control signal for the channel associated with the energized selector valve, in said slewing mode said control means (a) controlling the selector output means to operate said multiplexer means to energize the selector valves for all of the channels to be slewed, and (b) controlling the modulating output means to produce a flow rate through the modulating means adequate to slew all of the channels at a predetermined rate.

9. The multiplexed hydraulic control system of claim 8 further including feedback means associated with the actuator in each channel for providing a feedback signal representative of the actuator position;
- the control means being responsive to said feedback signal for de-energizing the selector means associated with a particular channel when the feedback means indicates that said channel is at the position demanded by the electrical control signal associated with that channel.

10. A multiplexed hydraulic control system having a plurality of channels for individually controlling the positions of a plurality of actuators in the respective channels in accordance with a corresponding plurality of electrical control signals, the control system comprising the combination of:
- a multiplexer comprising a plurality of selector valves, one for each channel, each selector valve having an output coupled to the associated channel, all of the selector valves sharing a common inlet;
- means for coupling a source of hydraulic fluid to the common inlet of the selector valves;
- feedback means associated with the actuator in each channel for providing a feedback signal indicative of actuator position; and
- control means having:
  - (a) a plurality of electrical outputs, one for each channel, for selectively energizing the selector valves in the channels;
  - (b) modulator output means for modulating the hydraulic fluid flow to the channels of the energized selector valves to produce hydraulic flow determined at least in part by the electrical control signals for the selected channels; and
  - (c) means responsive to the feedback means for positioning the actuators in the channels in accordance with the associated plurality of electrical control signals.

11. The multiplexed hydraulic control system of claim 10 in which element (b) of the control means includes means for pulse width modulating the output of the energized selector valve.

12. The multiplexed hydraulic control system of claim 11 in which element (b) of the control means includes means for controlling the "on" time of the energized selector valve.

13. The multiplexed hydraulic control system of claim 10 in which:
- the means for coupling includes modulating means responsive to a control signal for producing a modulated hydraulic flow, the modulated hydraulic flow being coupled to the common inlet of the selector valves; and
- element (b) of the control means further includes a modulator output for controlling the modulating means to produce a flow rate determined at least in part by the electrical control signals for the selected channels.

14. In a multiplexed hydraulic control system having a plurality of channels for individually controlling the positions of a plurality of actuators in the respective channels in accordance with a corresponding plurality of electrical control signals, the system having a controllable single source of modulated hydraulic fluid, a method of controlling the plurality of channels comprising the steps of:
- in a normal operating mode individually coupling the modulated hydraulic source to the individual channels while modulating the source in accordance with the electrical control signal for that channel; and
- in a slewing mode coupling the modulated hydraulic source to a plurality of channels for slewing the actuators in all of the associated channels while controlling the source of modulated hydraulic fluid to produce a flow rate compatible with the number of channels being slewed.

* * * * *